United States Patent [19]
Anderson et al.

[11] 3,765,535
[45] Oct. 16, 1973

[54] AERATION DEVICE FOR FILTER TANKS

[75] Inventors: Merlin H. Anderson; John J. Scholten, both of Ames, Iowa

[73] Assignee: General Filter Company, Ames, Iowa

[22] Filed: Feb. 17, 1972

[21] Appl. No.: 227,223

[52] U.S. Cl................. 210/274, 138/177, 239/546
[51] Int. Cl............................................. B01d 23/24
[58] Field of Search................ 61/11; 138/177, 178; 210/150, 274; 201/122, 124; 239/534, 546, 547

[56] References Cited
UNITED STATES PATENTS
1,998,279  7/1935  Hungerford........................ 210/274
3,186,644  6/1965  Ross et al. ......................... 261/122
3,677,936  7/1972  Bastiaanse ..................... 261/124 X

*Primary Examiner*—Samih N. Zaharna
*Assistant Examiner*—Ivars Cintins
*Attorney*—Dawson, Tilton, Fallon & Lungmus

[57] ABSTRACT

An aeration device for a filter tank comprises an expandable and collapsible flexible air hose which is adapted to be connected to a source of pressurized air. The air hose has a generally flattened transverse cross section in its normal or collapsed configuration which is provided by a pair of longitudinally extending spaced-apart flat wall portions and a pair of arcuate wall portions extending between the flat wall portions. The air hose extends generally horizontally within the tank, and a plurality of longitudinally spaced oblong orifices are provided through the lower arcuate wall portion. The orifices are closed against the passage of filter media when the air hose is in its normally flattened or collapsed configuration. When pressurized air is introduced to the hose, the hose expands into a transverse cross section which is more circular than the initial cross section and the slits open to permit air to flow outwardly through the hose. When the flow of pressurized air is discontinued, the hose collapses to its original flattened configuration in which the orifices are closed.

8 Claims, 9 Drawing Figures

PATENTED OCT 16 1973 3,765,535

AERATION DEVICE FOR FILTER TANKS

BACKGROUND

Filters for filtering water and waste water commonly comprise a tank and a bed of filter or contact media such as sand or the like which is supported by a bed of gravel. One such filter is disclosed in U.S. Pat. No. 1,998,279. Fluids are filtered by passing the fluid downwardly through the sand and the gravel bed and outwardly through the bottom of the tank. The filter may be periodically cleansed by a backwash process in which the flow of fluid is reversed and is caused to pass upwardly through the filter media.

In water and waste water filtration it is essential that positive, effective, and economical means be provided for thoroughly cleaning the filter media during the routine backwash process. This can be done by air washing, consisting of the introduction of air at some point below the filter media which agitates and scrubs the filter media. This agitation and scrubbing loosens accumulations of turbidity which have adhered to the filter media and which may then be washed away during backwash. In some waste water treatment processes this air distribution used during the filtering or contact processes also provides oxygen to support the biological reactions maintained in the filter.

U.S. Pat. No. 1,998,279 discloses one type of structure for introducing air to the filter media which includes a plurality of pipes provided with air openings along the tops thereof. However, these pipes are relatively expensive, and problems may arise in maintaining an opening large enough to permit effective passage of air while preventing the entry of filter media into the pipe.

SUMMARY

The invention provides an economical, easy-to-install aeration device which comprises a plurality of flexible, flattened air hoses. Oblong orifices for aerating the filter media are provided along one of the rounded portions of each hose, and when pressurized air is not being introduced to the hoses, the flattened configuration thereof maintains the orifices closed against the entry of filter media. When pressurized air is introduced to the hose, the flexible hose expands into a more circular configuration, and the orifices open to permit the air to escape. By providing the orifices in the rounded edge portions of the hose, each orifice opens from the inside of the hose first, and the outside of the orifice which is in contact with the filter media, does not open until air begins to pass through the orifice, thereby effectively preventing the entry of the filtering particles. As the pressure within the hose decreases, the orifice begins to close on the outside of the hose first as the hose collapses, and the orifice becomes closed to the passage of filter media when the passage of pressurized air stops. The water pressure in the tank assists in holding the hose in the flattened configuration and in maintaining the orifices closed. The flexible plastic hoses are relatively inexpensive, and the hoses can be quickly connected to an air header or conduit and arranged in any desired pattern within the tank.

DESCRIPTION OF THE DRAWING

The invention will be explained in conjunction with an illustrative embodiment shown in the accompanying drawing, in which.

DESCRIPTION OF SPECIFIC EMBODIMENT

Figure 1:
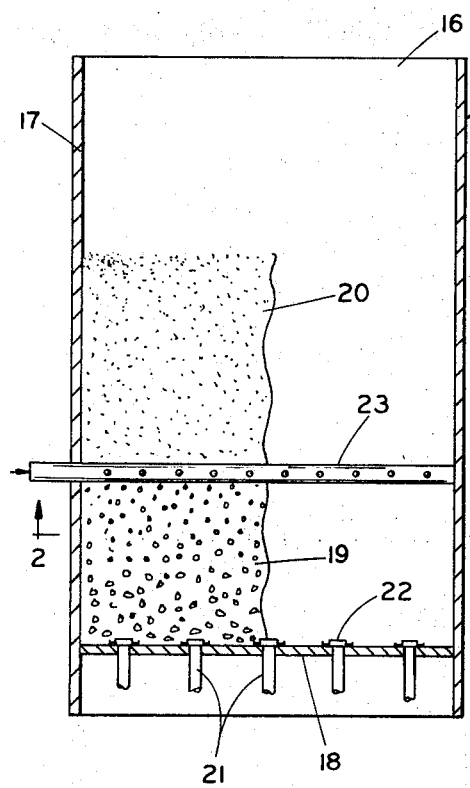
FIG. 1 is a vertical sectional view of a filter equipped with the inventive aeration device.

Referring to FIG. 1, the numeral 15 designates generally a conventional filter for fluids such as water and waste water which includes a cylindrical filter tank 16 having a cylindrical side wall 17 and a bottom wall 18. A gravel bed 19 is supported by the bottom of the tank, and a bed 20 of filter media such as sand or other particulate matter is supported by the gravel bed. One or more drain pipes 21 may extend through the bottom of the tank, and the upper ends of the drain pipes may be protected by covers 22 which are spaced slightly above the tank bottom. Although the particular tank illustrated is cylindrical, it can be provided in a variety of shapes and sizes and can be formed of metal, concrete, or other suitable material.

Figure 2:
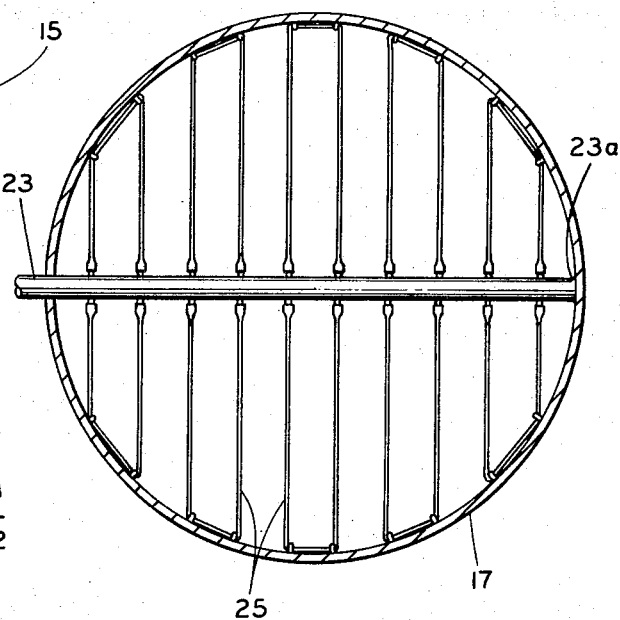
FIG. 2 is a horizontal sectional view taken along the line 2—2 of FIG. 1.

An air header pipe or conduit 23 extends through the side wall of the tank and into the chamber provided by the tank approximately at the interface between the supporting bed 19 and the filter bed 20. In the particular embodiment illustrated, the filter tank is cylindrical, and the air header extends diametrically across the filter tank as shown in FIG. 2. Either or both ends of the header may be connected to a source of pressurized air, but in the illustration given the end 23a is closed and secured, as by welding, to the tank wall.

Figure 3:
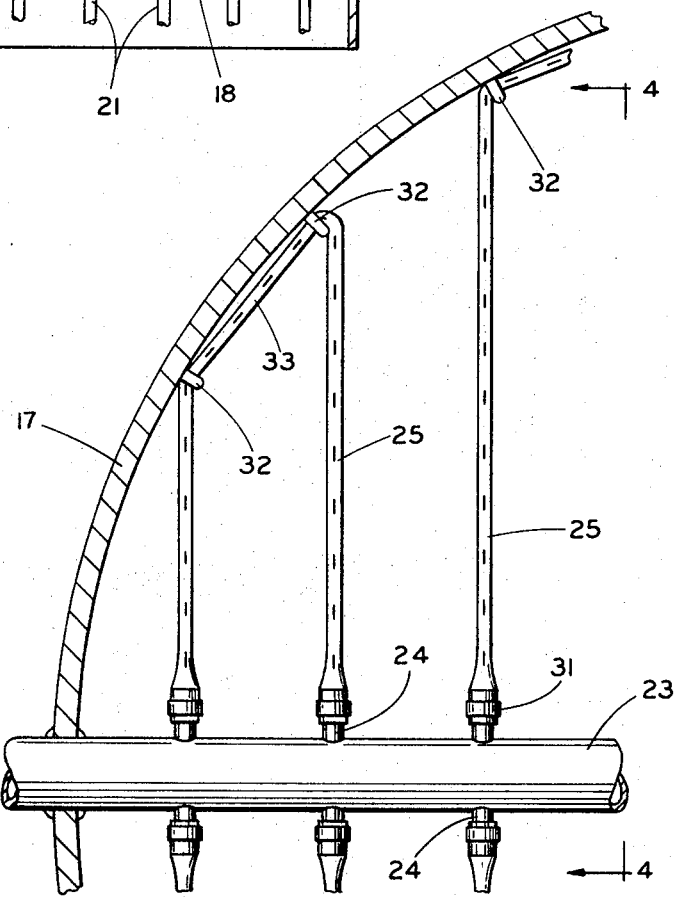
FIG. 3 is an enlarged fragmentary view of a portion of FIG. 2.
Figure 4:
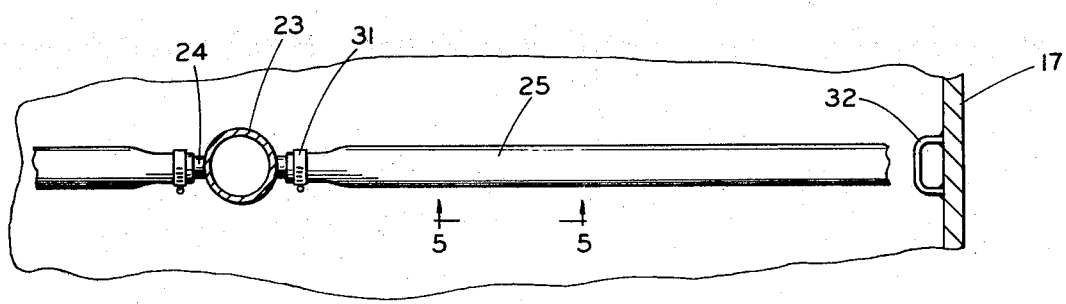
FIG. 4 is a fragmentary elevational view taken along the line 4—4 of FIG. 3.
Figures 5, 7:
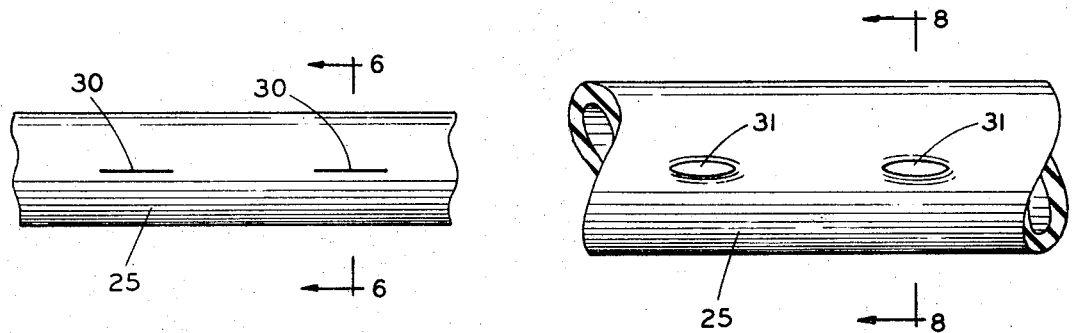
FIG. 5 is a fragmentary plan view taken along the line 5—5 of FIG. 4.
FIG. 7 is a view similar to FIG. 5 showing the hose in its expanded configuration.

Referring now to FIG. 3, the header is provided with a plurality of longitudinally spaced nipples or connectors 24 which extend radially outwardly from the header at diametrically opposed locations. An elongated flexible plastic hose 25 is connected to each of the nipples 24, and the hoses are arranged generally in a horizontal plane which extends through the header.

Figures 6, 8, 9:
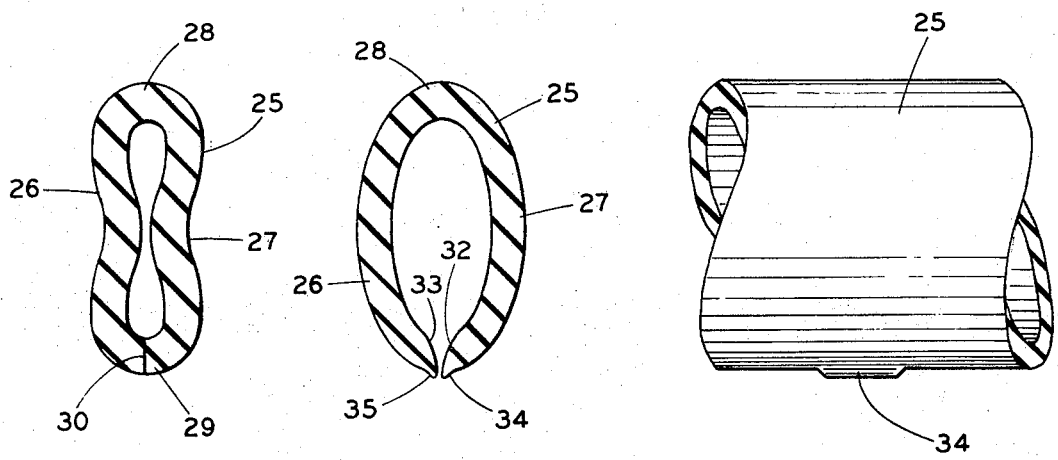
FIG. 6 is a sectional view of the hose in its normally flattened or collapsed configuration taken along the line 6—6 of FIG. 5.
FIG. 8 is a sectional view of the hose in its expanded configuration taken along the line 8—8 of FIG. 7.
FIG. 9 is a fragmentary side elevational view of the hose of FIG. 8.

Each of the hoses is formed of suitable elastomeric material conventionally used for air or water hoses, and the hose is formed so that it normally assumes the flattened or collapsed configuration shown in FIG. 6. This flattened configuration is provided by a pair of opposed flat peripheral wall portions 26 and 27 and a pair of arcuate peripheral wall portions 28 and 29 which connect the flat wall portions, providing a transverse cross section of the hose with a long axis extending between the arcuate wall portions and a short axis extending between the flat wall portions. A plurality of elongated orifices 30 are provided through the arcuate wall portion 29 at longitudinally spaced locations, and the natural flattened configuration of the hose presses the edges of each orifice together to close the orifice.

Each hose is arranged within the tank so that the long transverse axis and the flat wall portions extend generally vertically with the arcuate wall portion 29 and the orifices therein positioned at the bottom of the hose. The nipples 24 can have a circular cross section, and the ends of the hoses may be secured by slipping them over the nipples and applying a conventional adjustable clamping strap 31. In the particular embodiment illustrated, each end of each hose is secured to a nipple 24 on the air header, but each hose may communicate with the header through only one end if desired.

As can be seen in FIGS. 2 and 3, each end of each hose extends outwardly from the header in a generally horizontal plane toward the wall of the tank, and the hose is supported at spaced locations along the wall of the tank by hooks or loops 32 to provide an intermediate chordally extending hose portion 33. The length of each hose therefore varies according to the locations from which it extends from the header.

In operation the fluid which is to be filtered is introduced at the top of the filter tank and passes downwardly through the filter media 20, the supporting bed 19, and out through the drain pipes 21. During filtering, air is not introduced through the header 23, and the hoses 25 remain in their flattened configurations in which the orifices 30 are maintained closed. The fluid pressure within the filter tank provides an additional force tending to collapse the flexible hose and may even press the flat walls together. In the flattened configuration the edges of each orifice are pressed rather firmly together, and the relatively fine filter particles are prevented from entering the hoses.

During the backwash process the filter bed can be aerated and further cleansed by introducing pressurized air through the air header 23 and the nipples 24. As the air pressure within each hose increases, the flat side wall portions 26 and 27 tend to separate, and the hose begins to assume a more circular configuration in which the difference between the long and short transverse axes is reduced. As the straight wall portions spread, each orifice 30 begins to open along the inner edges 32 and 33 thereof (FIG.8) while the outer edges 34 and 35 remain closed. The outer edge portions of the hose thereby act as sealing lips which prevent the entry of filter media as the air pressure increases within the hose and the hose expands. When the air pressure increases sufficiently to flow through the orifice, the outer edges 34 and 35 separate, and the outward flow of air prevents entry of filter media. The shape of the open orifice has been exaggerated somewhat in FIG. 8 for the purpose of illustration, but we have found that the orifices do open from the inside first.

When the filter material has been cleaned, the air supply to the header can be turned off. As the air pressure within each hose decreases and the hose collapses, the orifices close along their outer edges 34 and 35 first, and the filter particles are thereby prevented from entering the hose.

Other uses of the hoses include use for introduction of air or other gases such as oxygen in waste treatment processes. In such operation the waste fluid to be treated may be introduced at the bottom, at the lower part or at the central part of the filter. The waste fluid then flows in an upwardly direction and is withdrawn off of the top of the filter tank. During this flow air is introduced through the hoses, causing the orifices to open as heretofore described.

We have found that if the orifices are provided in the flat portions of the hose, the orifices would open from the outside first as the pressure within the hose increased. Filter material could therefore enter the orifices before air began to flow through the openings. As the pressure decreased, the openings would close from the inside first. The likelihood that particles would enter the opening would therefore be increased.

Providing the openings through the arcuate or edge portions of the hose not only provides better sealing, but provides better repeatability in achieving the same air flow each time the same air pressure is applied. Although the air openings in the hoses are oblong orifices in the particular embodiment illustrated, the openings may have other configurations, such as circular perforations.

We have also found that it is more advantageous to provide the orifices in the bottom arcuate edge of the hose rather than in the top edge, but the orifices could be provided in the top edge or in both the top and bottom edges. We have had good results by locating the orifices along the hoses with the centers thereof spaced apart a distance of about 4 to about 6 inches, the orifices having a length of from about three-eighths inch to about 1 inch. However, the spacing between orifices and the length of the orifices can be varied as desired to control the amount of air which passes through the hoses.

Since the hoses are plastic, they can be cut to the desired length and installed quickly and easily, and the flexible hoses can be arranged in a desired pattern to provide the aeration that is most suitable for the particular filter application. For example, in FIG. 2 the air hoses extend outwardly from the header pipe, along a portion of the tank wall, and back toward the header. However, they can be arranged along other paths within the tank. Also, the header can be eliminated and one or more air hoses can be used into which the pressurized air is introduced directly.

Although the header and air hoses are normally located in the plane through the approximate interface between the filter media and the support bed, the hoses can be located above or below this plane for certain applications.

While in the foregoing specification detailed descriptions of specific embodiments of our invention have been set forth for the purpose of illustration, it is to be understood that many of the details hereingiven may be varied considerably by those skilled in the art without departing from the spirit and scope of the invention.

We claim:

1. In a tank having media for filtering fluid and means for supplying pressurized air, an elongated flexible air hose positioned below at least some of the filtering media and connected to the air supplying means, the air hose having a normally flattened transverse cross section provided by a pair of opposed substantially flat and substantially vertically extending peripheral wall portions and upper and lower arcuate peripheral wall portions extending between the flat portions, the air hose being provided with a plurality of longitudinally spaced openings through the lower arcuate wall portion, the substantially flat wall portion and the upper arcuate wall portion being imperforate, the openings in the lower arcuate wall portion being normally closed against the passage of filter media therethrough, the hose being expandable by the introduction of pressurized air thereto to open the openings whereby air may flow through the openings and through the filter media above the hose, the hose being collapsible to its original configuration in which the openings are closed when pressurized air is no longer introduced to the hose.

2. The structure of claim 1 in which the hose is made of elastomeric material.

3. The structure of claim 1 in which the centers of the openings are spaced from about 4 to about 6 inches apart.

4. The structure of claim 3 in which the openings are elongated orifices from about three-eighths inch to about 1 inch long.

5. The structure of claim 1 in which the openings are elongated orifices from about three-eighths inch to about 1 inch long.

6. The structure of claim 1 in which the means for supplying pressurized air includes an air conduit supported within the tank, the air hose being connected to the air conduit.

7. The structure of claim 1 in which the tank has a vertically extending cylindrical side wall, the air conduit extending generally diametrically across the tank, each hose having both ends thereof connected to the conduit and extending outwardly from the air conduit toward the side wall of the tank.

8. The structure of claim 7 in which an intermediate portion of each hose extends adjacent the side wall of the tank, and means on the tank for supporting the intermediate portions of the hoses.

* * * * *